(12) United States Patent
Saito et al.

(10) Patent No.: US 7,829,811 B2
(45) Date of Patent: Nov. 9, 2010

(54) ROTARY SWITCH

(75) Inventors: Toshiaki Saito, Ise (JP); Norihiro Ida, Tsu (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 47 days.

(21) Appl. No.: 11/861,581

(22) Filed: Sep. 26, 2007

(65) Prior Publication Data

US 2008/0073197 A1    Mar. 27, 2008

(30) Foreign Application Priority Data

| Sep. 26, 2006 | (JP) | ............................. 2006-261504 |
| Sep. 26, 2006 | (JP) | ............................. 2006-261505 |
| Sep. 26, 2006 | (JP) | ............................. 2006-261506 |
| Sep. 26, 2006 | (JP) | ............................. 2006-261507 |

(51) Int. Cl.
  *H01H 19/14*   (2006.01)
(52) U.S. Cl. .................................. 200/564; 200/61.85
(58) Field of Classification Search ......... 200/564–571, 200/6 R, 11 R–11 TW, 61.85, 61.88; 439/21, 439/22
  See application file for complete search history.

(56) References Cited

U.S. PATENT DOCUMENTS

| 2,990,725 | A |   | 7/1961  | King |
| 4,771,149 | A | * | 9/1988  | Armstrong et al. ........... 200/336 |
| 4,837,413 | A | * | 6/1989  | Schwab et al. ............. 200/11 R |
| 4,883,284 | A |   | 11/1989 | Nakazawa et al. |
| 5,259,108 | A | * | 11/1993 | Schaffer et al. ............... 29/622 |
| 5,571,999 | A | * | 11/1996 | Harris ........................ 200/565 |
| 6,096,988 | A | * | 8/2000  | Tsukamoto et al. ......... 200/61.88 |
| 6,194,673 | B1 | * | 2/2001 | Sato et al. ...................... 200/4 |

(Continued)

FOREIGN PATENT DOCUMENTS

DE          3840252          8/1989

(Continued)

OTHER PUBLICATIONS

English language Abstract of DE 3840252, Aug. 3, 1989.

(Continued)

*Primary Examiner*—Renee Luebke
*Assistant Examiner*—Lisa Klaus
(74) *Attorney, Agent, or Firm*—Greenblum & Bernstein P.L.C.

(57) ABSTRACT

A rotary switch, which is used to detect a state of a stand with respect to a body of a motorcycle, for example, comprises a housing having a ring-shaped outer wall so that an annular recess is formed; a rotor which is rotatably supported on the housing around a center axis of the annular recess; a plurality of stationary contacts each having a circular arc shape and provided on a bottom face of the annular recess; a moving contact which is provided on the rotor and is connected and disconnected with the stationary contacts following to rotation of the rotor with respect to the housing; and a cable draw-out portion from which an electric cable including a plurality of inner cables respectively connected to at least the stationary terminals is drawn out from the housing. The rotor has a U-shaped joint which holds an end portion of the stand pivotally mounted on the body, so that the rotor rotates corresponding to rotation of the stand with respect to the stationary portion.

19 Claims, 17 Drawing Sheets

U.S. PATENT DOCUMENTS

| | | |
|---|---|---|
| 6,365,849 B1 * | 4/2002 | Ono .................. 200/14 |
| 6,623,299 B1 | 9/2003 | Liu |
| 7,109,430 B2 * | 9/2006 | Horton et al. .......... 200/296 |
| 2004/0212172 A1 | 10/2004 | Nakazawa et al. |
| 2006/0089726 A1 | 4/2006 | Hatemata et al. |
| 2006/0207092 A1 | 9/2006 | Perle et al. |

FOREIGN PATENT DOCUMENTS

| | | |
|---|---|---|
| EP | 0698947 | 2/1996 |
| EP | 1442970 | 8/2004 |
| EP | 1699116 | 9/2006 |
| JP | 2-8688 | 1/1990 |
| JP | 6-31038 | 4/1994 |
| JP | 8-287782 | 11/1996 |
| JP | 2003-249145 | 9/2003 |
| JP | 2004 231094 | 8/2004 |

OTHER PUBLICATIONS

English language Abstract of EP 1699116, Sep. 6, 2006.
English language Abstract of JP 2004-231094.

* cited by examiner

ROTARY SWITCH

BACKGROUND OF THE INVENTION

1. Field of the Invention

The present invention relates to a rotary switch.

2. Description of the Related Art

Conventionally, a rotary switch, which comprises a housing with a stationary contact and a rotor with a moving contact, is provided. The moving contact, which is connected and disconnected with the stationary contact, is rotatably supported on the housing in a direction of connecting and disconnecting the moving contact with the stationary contact (Japanese Laid-Open Patent Publication No. 2004-231094, for example).

For example, as shown in FIGS. 15 and 16, a rotary switch 100 having the above configuration is attached to a joint between a body 110 and a stand 120 in a motorcycle so as to detect the stand 120 stands. When the stand 120 stands during stop of the motorcycle, an engine of the motorcycle is disenabled to be started, so that it is possible too prevent the start of the motorcycle with the stand 120 standing.

As shown in FIG. 16, the stand 120 is pivotally attached to the body 110 with a bolt 130. A housing 101 of the rotary switch 100 includes a main body 102 which stores stationary contacts (not shown) and a part of a rotor 103, a cable draw-out portion 104 from which an electrical wire 140 electrically connected to the stationary contacts and a moving contact is pulled out, and a holding portion 105 which holds a protrusion 111 protruded from the body 110 with the cable draw-out portion 104. The housing 101 is connected with the body 110 by holding the protrusion 111 between the cable draw-out portion 104 and the holding portion 105. The rotor 103 is connected with the stand 120 by being screwed to the stand 120 with a screw 131 which is screwed in a screw hole 132 on the stand 110. When the stand 120 rotates with respect to the body 110 as shown by arrow A1 in FIG. 15, the rotor 103 works with the stand 120 and rotates with respect to the housing 101, and the state of the contact point (connection of the moving contact with the stationary contact) is switched based on whether the stand 120 stands or not. Moreover, a protrusion 121 which protrudes on the same direction as the protrusion 111 on the body 110 is provided on the stand 120. A connection spring 133 is provided between the protrusion 111 on the body 110 and the protrusion 121 on the stand 120. Since the connecting spring 133 is made of an extension spring, the stand 120 maintains its state whether to stand during stop of the motorcycle or be stored during running with a tensile force of the connecting spring 133.

A screw insertion hole 103a through which the screw 131 penetrates for fixing the rotor 100 to the stand 120 receives a force at every time when the stand 120 changes its state, so that a metal component 103b of cylindrical shape is provided to configure an inner surface of the screw insertion hole 103a with an insert molding of the rotor 103 to reinforce the screw insertion hole 103a. However, when the metal component 103b is used in the rotor 103, a production cost relatively increases.

FIG. 17 shows a configuration of the stationary contacts in the main body 102 of the housing 101 of the conventional rotary switch 100. A annular recess 102a having a circular cross section perpendicular to a depth direction thereof is provided on the main body 102 of the housing 101. A plurality of (for example two) stationary contacts 106A and 106B each having a circular arc shape is arranged along a periphery of the annular recess 102a. When the rotor 103 rotates on a center axis of the annular recess 102a with respect to the main body 102, the moving contact (not shown) moves following to the rotation of the rotor 103 between a position to contact the stationary contact 106A which corresponding to the position when the stand 120 stands, for example, and another position to contact the stationary contact 106B which corresponds to the position when the stand 120 turns up.

Since the stationary contacts 106A and 106B are arranged along the periphery of the annular recess 102a, the stationary contacts 106A and 106B can be strongly held on the main body 102 of the housing 101 by embedding a part of each of the stationary contacts 106A and 106B in the periphery of the annular recess 102a. In addition, the stationary contacts 106A and 106B can be positioned by the inner surface of the annular recess 102a in manufacturing of the rotary switch 100.

When a distance D1 between the stationary contacts 106A and 106B is enlarged in order to secure electrical insulation between the stationary contacts 106A and 106B, the moving contact falls into a gap between the stationary contacts 106A and 106B in switching the contact, and thereby a malfunction occurs.

In the example shown in FIG. 17, a groove 102c is provided between the stationary contacts 106A and 106B on a bottom surface 102b of the annular recess 102a to secure a creeping distance D2 between the stationary contacts 106A and 106B along the bottom surface 102b of the annular recess 102a without enlarging the distance D1 between the stationary contacts 106A and 106B. According to such a conventional configuration, it, however, is impossible to secure the creeping distance D3 along the periphery of the annular recess 102a.

SUMMARY OF THE INVENTION

The present invention is to solve the problem of the conventional rotary switch described above, and an object of the present invention is to provide a rotary switch which enables to secure the creeping distance between the stationary contacts with enabling the cost reduction. Another object of the present invention is to provide a rotary switch which is easily attached to different types of objects to be detected a state of a movable portion with respect to a stationary portion such as a stand with respect to a body of a motorcycle. Still another object of the present invention is to provide a rotary switch having a cable draw-put portion from which an electric cable is drawn from a housing of the rotary switch, by which sealing process of the cable draw-out portion and the electric cable by a sealing material becomes simple. Still another object of the present invention is to provide a rotary switch having a cable draw-put portion from which an electric cable is drawn from a housing of the rotary switch, by which a connection of the electric cable becomes easier and reliability of connection of the electric cable is secured.

A rotary switch in accordance with an aspect of the present invention comprises: a housing having a ring-shaped outer wall so that an annular recess is formed; a rotor which is rotatably supported on the housing around a center axis of the annular recess; a plurality of stationary contacts each having a circular arc shape and provided on a bottom face of the annular recess on a same circle along an inner face of the outer wall of the housing; and a moving contact which is provided on the rotor and is connected and disconnected with the stationary contacts following to rotation of the rotor with respect to the housing, wherein at least one stationary contact has a cutout of a rectangular shape located at a corner between an end face of the stationary contact facing another stationary contact and an outer periphery of the stationary contact facing the inner face of the outer wall of the housing so that a creeping distance along the inner face of the outer wall of the housing is secured a predetermined distance.

According to the cutout, the creeping distance along the inner face of the outer wall of the housing, that is, along an outer periphery of the annular recess can be secured, even though a distance or a width of a gap between the stationary contacts is narrowed so as not to fall the moving contact into the gap between the stationary contacts in switching the contact.

In the above mentioned configuration, it is preferable that each stationary contact has the cutout so as to face each other.

Furthermore, it is preferable that a connection contact having an annular portion concentrically disposed inside of the stationary contacts is further provided on the bottom face of the annular recess; and grooves are provided between the annular portion of the connection terminal and the stationary contacts and between end faces of the stationary contacts on the bottom face of the annular recess to secure creeping distances between them.

Furthermore, it is preferable that the housing further has a ring-shaped inner wall; an inside edge of the annular portion of the connection terminal is embedded in the inner wall of the housing; and outside edges of the stationary contacts are embedded in the outer wall of the housing, respectively.

A rotary switch in accordance with another aspect of the present invention comprises: a housing which has stationary contacts and is connected with a stationary portion of an object; and a rotor which has a moving contact connected and disconnected with the stationary contacts, is rotatably supported on the housing around a center axis, and is connected with a movable portion of the object, wherein the rotor has a U-shaped coupler which holds an end portion of the movable portion near to a rotation axis of the movable portion pivotally mounted on the stationary portion, so that the rotor rotates corresponding to rotation of the movable portion with respect to the stationary portion.

According to the U-shaped coupler, it is possible to apply the rotary switch of the present invention to a plurality of types of the objects such as motorcycles which have different rotation axis positions of the stand with respect to the body or different shapes of the stand.

It is preferable that the rotor is made of a synthetic resin; the U-shaped coupler has a U-shape protrusion upward from a rim of a flange of the rotor which is perpendicular to the rotation axis of the movable portion; and both end portions of the U-shaped protrusion directly contact with the movable portion.

Furthermore, it is preferable that the both end portions of the U-shaped protrusion are formed so that a distance between inner faces of them facing each other becomes gradually narrower toward the ends of the coupler.

Still furthermore, it is preferable that a central portion of the U-shaped protrusion is formed thinner in comparison with both end portions of the U-shaped protrusion so as to provide a gap between the U-shaped coupler and the movable portion.

A rotary switch in accordance with still another aspect of the present invention comprises: a housing having a ring-shaped outer wall so that an annular recess is formed; a rotor which is rotatably supported on the housing around a center axis of the annular recess; a plurality of stationary contacts each having a circular arc shape and provided on a bottom face of the annular recess on a same circle along an inner face of the outer wall of the housing; a moving contact which is provided on the rotor and is connected and disconnected with the stationary contacts following to rotation of the rotor with respect to the housing; and a cable draw-out portion from which an electric cable including a plurality of inner cables respectively connected to at least the stationary terminals is drawn out from the housing, wherein the cable draw-out portion has a terminal base on which terminals connected to at least the stationary contacts are held; the terminal base and the electric cable are respectively sealed by a sealing material under a condition that core wires of the internal cables are respectively electrically connected to the terminals; and the terminal base has a flange that restricts an area to which the sealing material flows in sealing process.

In the sealing process, since the flange serves as a stopper of the flow of the sealing material, an area to which the sealing material flows is restricted by the flange, and thus, the sealing material cannot flow rearward of the flange. In other words, there is no weld flash protruded rearward from the flange. Thus, it is no need to control the area to which the sealing material flows by pressure of the sealing material in the injection molding, for example. In addition, the condition of molding the sealing material can be loosened and the sealing of the terminal base can be made easier in comparison with a case that no flange is provided on the terminal base for molding the sealing material, and consequently the sealing process of the cable draw-out portion becomes easier.

It is preferable that the flange is formed at a rear end of a main body of the terminal base to protrude outward along an outer periphery of the main body in a direction perpendicular to a center axis of the core wire.

Furthermore, it is preferable that the sealing material is an elastomer.

A rotary switch in accordance with still another aspect of the present invention comprises: a housing having a ring-shaped outer wall so that an annular recess is formed; a rotor which is rotatably supported on the housing around a center axis of the annular recess; a plurality of stationary contacts each having a circular arc shape and provided on a bottom face of the annular recess on a same circle along an inner face of the outer wall of the housing; a moving contact which is provided on the rotor and is connected and disconnected with the stationary contacts following to rotation of the rotor with respect to the housing; and a cable draw-out portion from which an electric cable including a plurality of inner cables respectively connected to at least the stationary terminals is drawn out from the housing, wherein the cable draw-out portion has a terminal base on which terminals connected to at least the stationary contacts are held; and the terminal base has a plurality of core wire guides formed at both sides of the terminals each to guide a front end portion of a core wire of the internal cable which is not coated by an insulation coating, and a plurality of internal cable guides each to guide a portion of the internal cable coated by the insulation coating.

When the core wires of the internal cables are introduced on the terminals, the internal cables are guided by the core wire guides and the internal cable guides, so that the connection of the core wires of the internal cables to the terminals becomes easier. In addition, when the core wires of the internal cables are introduced on the terminals, displacements of the internal cables are prevented by the core wire guides 86 and the internal cable guides, so that reliability of connection of the core wires and the terminals is secured.

It is preferable that each of the core wire guide is configured of a plurality of protrusions that nips the core wire from both sides in a radial direction of the core wire.

Furthermore, it is preferable that each of the internal cable guide is a groove formed on an end portion of the terminal base opposite to the housing of the rotary switch.

Still furthermore, it is preferable that the terminal base and the electric cable are respectively sealed by a sealing material under a condition that core wires of the internal cables are respectively electrically connected to the terminals.

Still furthermore, it is preferable that the terminal base has a flange that restricts an area to which the sealing material flows in sealing process, and is formed at a rear end of a main body of the terminal base to protrude outward along an outer periphery of the main body in a direction perpendicular to a center axis of the core wire.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
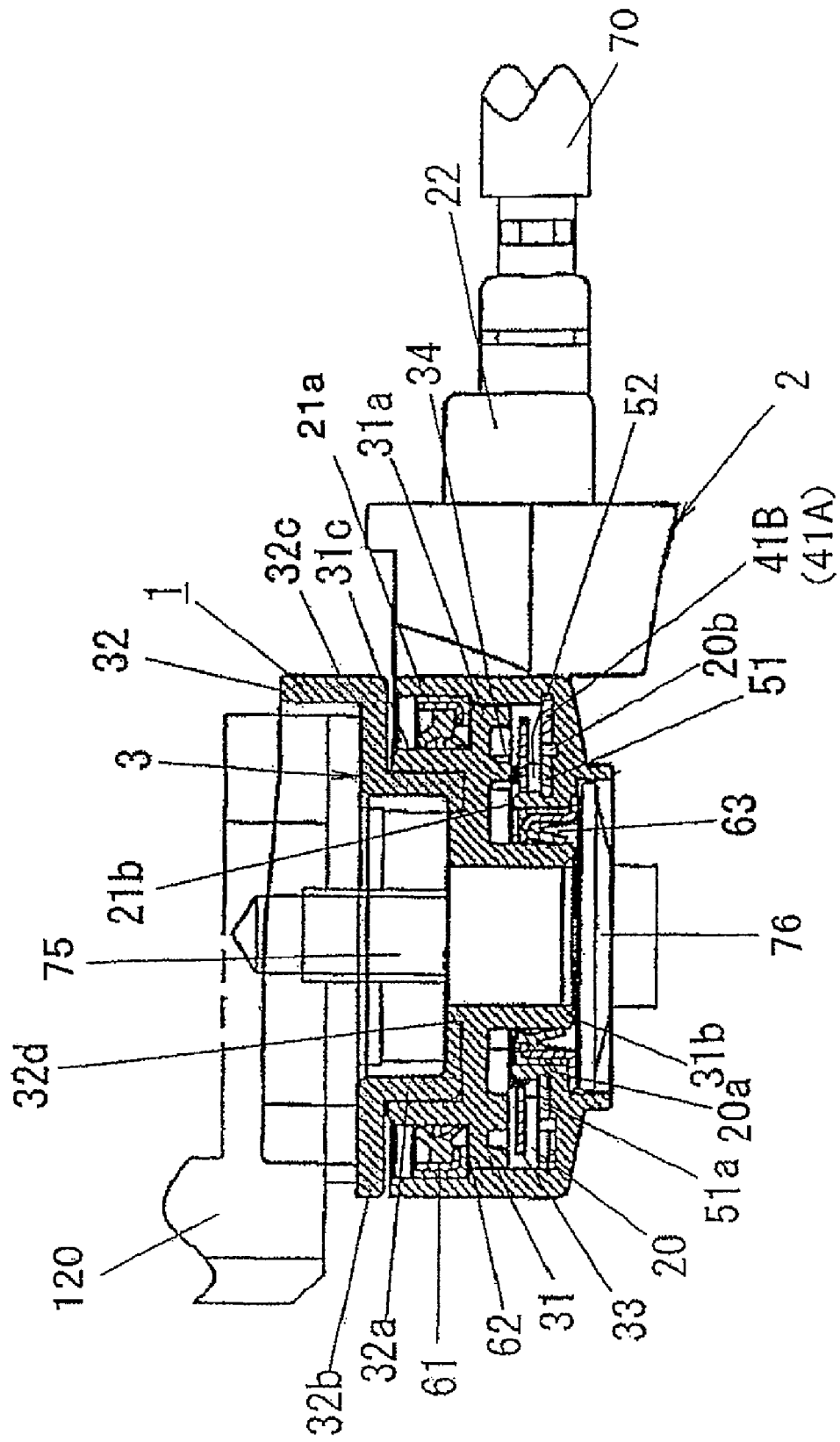
FIG. 1 is a cross-sectional view showing a configuration of a rotary switch in accordance with a preferred embodiment of the present invention.
Figure 2:
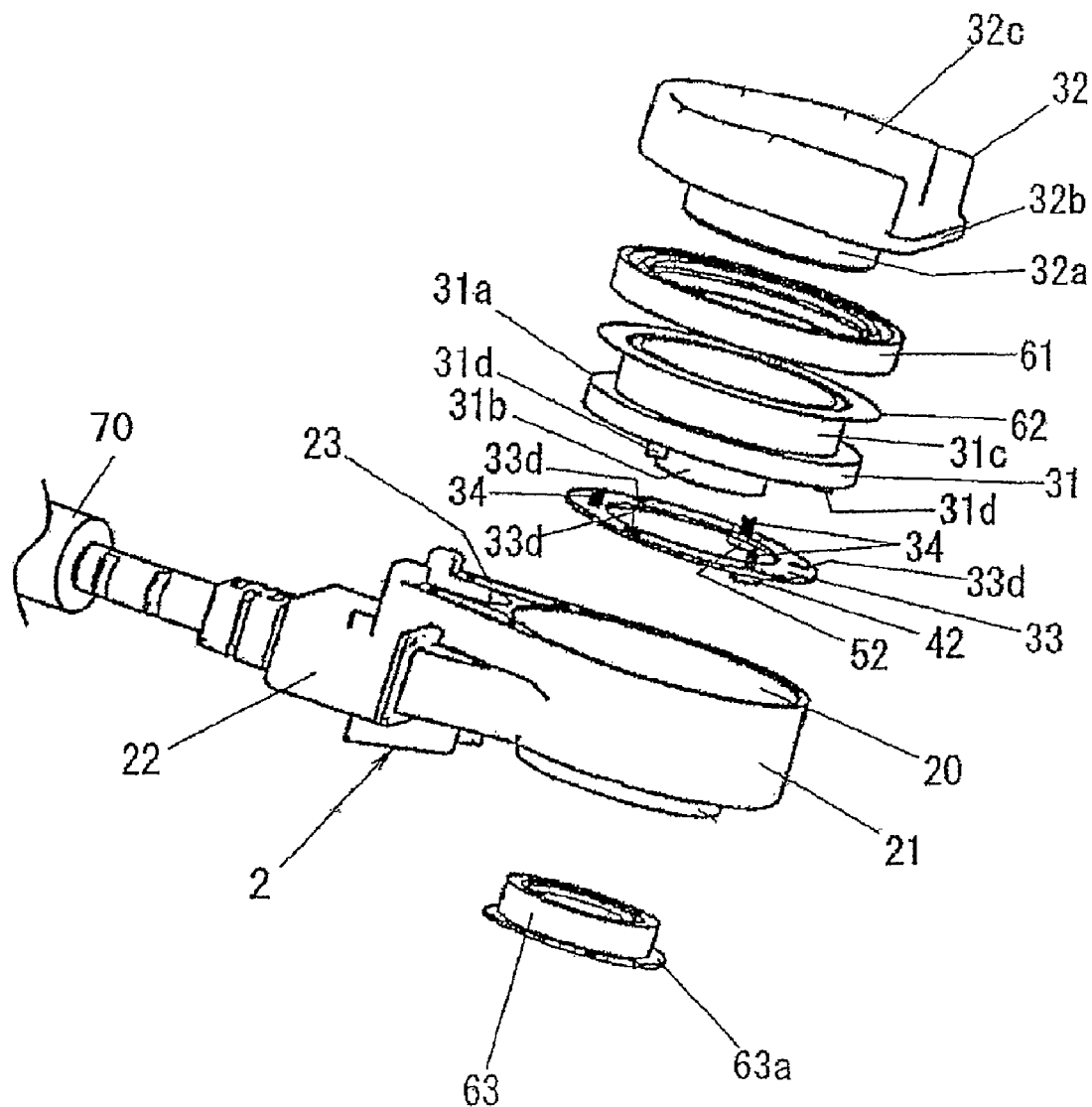
FIG. 2 is an exploded perspective view showing the configuration of the rotary switch.

A rotary switch in accordance with a preferred embodiment of the present invention is described with reference to the drawings. FIG. 1 is a cross sectional view of a rotary switch 1 in accordance with an embodiment of the present invention and FIG. 2 is an exploded perspective view of the rotary switch 1. Hereinafter, "upward" and "downward" are described on the basis of FIG. 1.

As shown in FIGS. 1 and 2, the rotary switch 1 comprises a housing 2 and a rotor 3 which is rotatably supported on the housing 2. The housing 2 further comprises a main body 21 which has a cylindrical shape with an annular recess 20, a cable draw-out portion 22, and a holding portion 23. The rotor 3 further comprises an inner rotor 31 which is stored in the annular recess 20, an outer rotor 32 which is mechanically coupled with the inner rotor 31, a movable contact 33 which is fixed on and rotated with the inner rotor 31, and a first oil seal 61, a slide plate 62 and a second oil seal 63. The inner rotor 31 and the outer rotor 32 are respectively made of a synthetic resin, for example.

Figure 3:
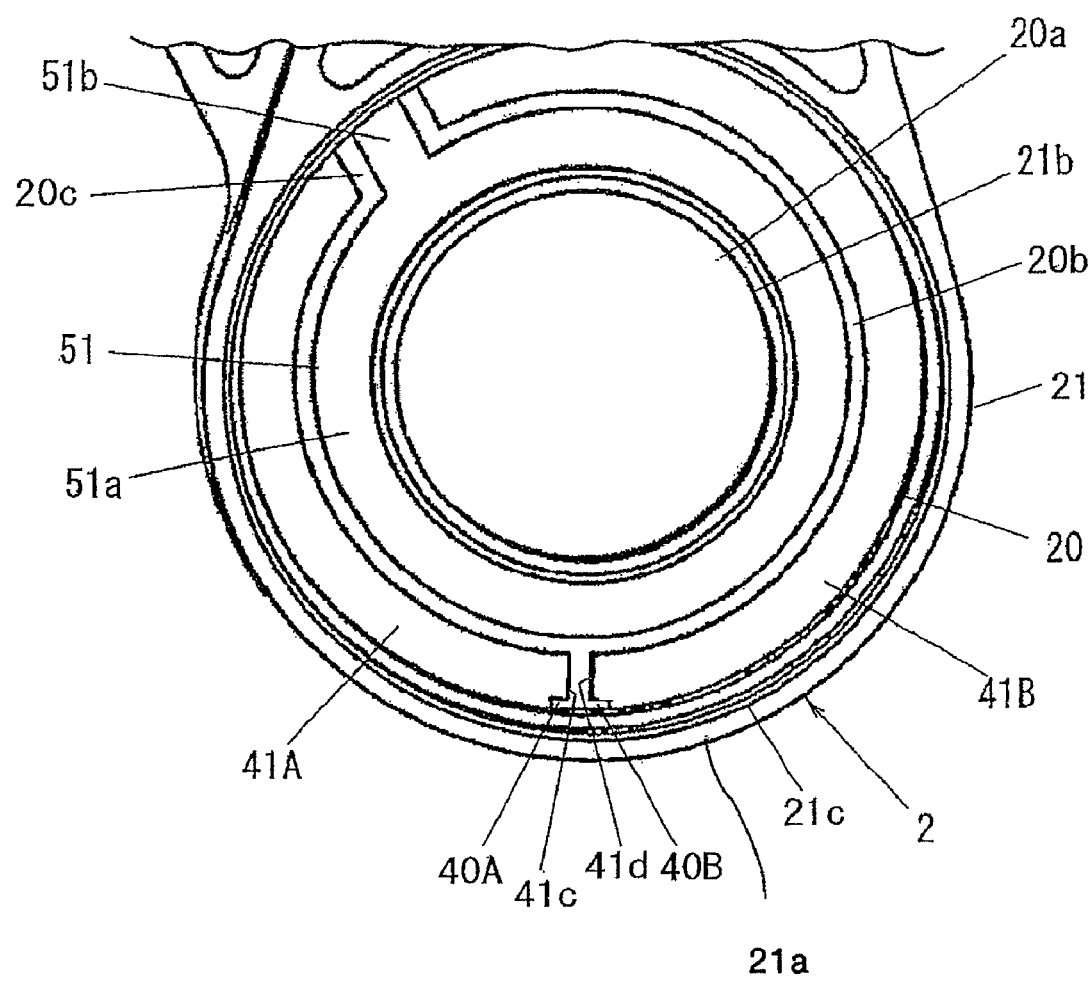
FIG. 3 is a plain view showing a main portion of a housing of the rotary switch.
Figure 4:
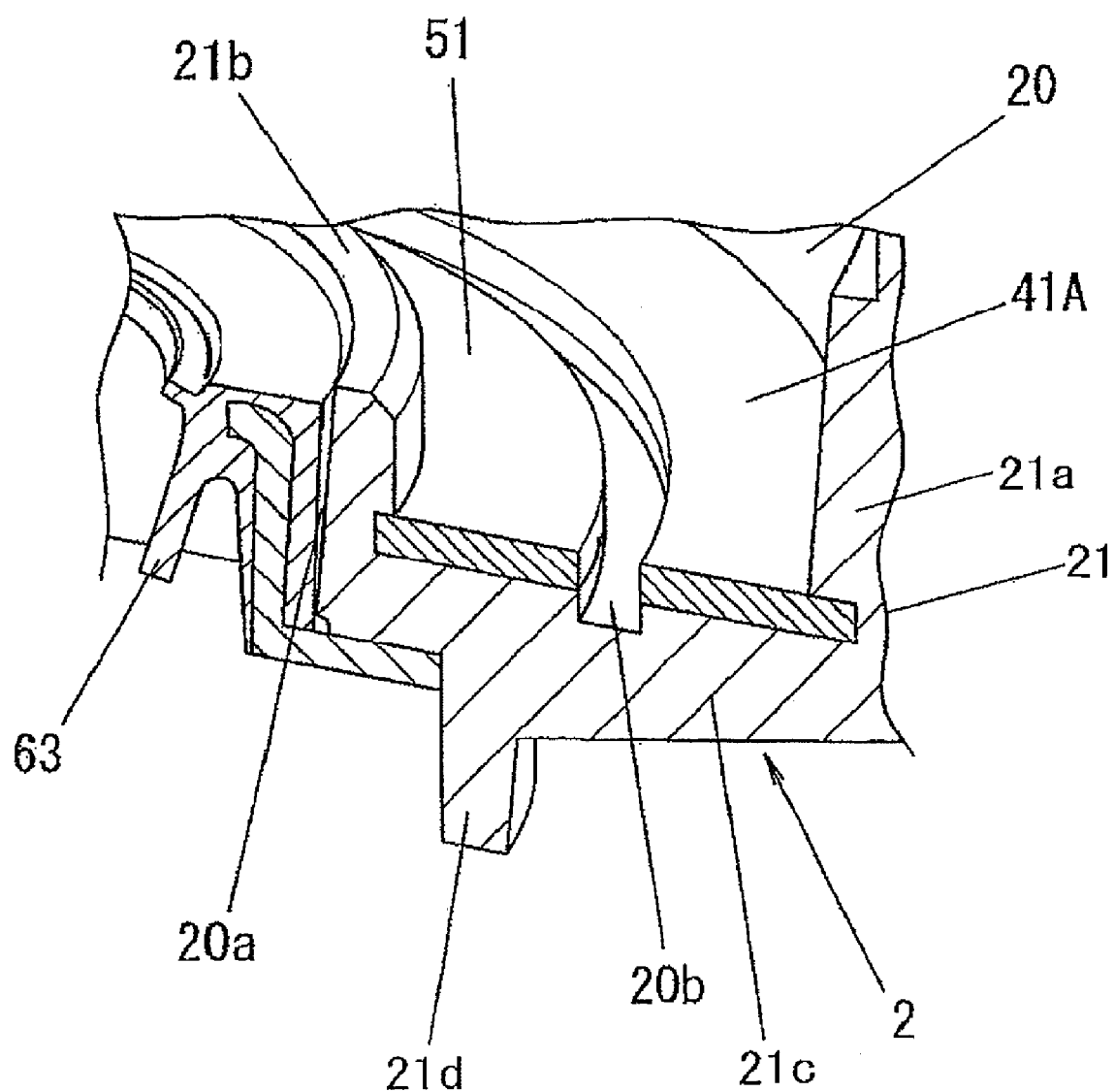
FIG. 4 is a partially sectional perspective view showing a detailed configuration of a main body of the housing.

FIG. 3 is a plain view of the main body 21 of the housing 2. FIG. 4 is a partial perspective view showing a detailed configuration of the main body 21.

The main body 21 has a ring-shaped outer wall 21a, a ring-shaped inner wall 21b formed along an opening of an insertion hole 20a, an annular bottom wall 21c and an insertion hole 21, so that an annular recess 20 is formed between the outer wall 21a and the inner wall 21b. A plurality of, for example, two stationary contacts 41A and 41B is held on the bottom wall 21c of the main body 21. Each of the stationary contacts 41A and 41B is made of a metal, for example, and has a flat circular arc shape observed in an up-down direction. The stationary contacts 41A and 41B are attached to an upper face of the bottom wall 21c (that is, a bottom face of the annular recess 20) on the same circle along an inner face of the outer wall 21a (that is, an outer periphery of the annular recess 20).

A first connection terminal 51 having an annular portion 51a concentrically disposed inside of the stationary contacts 41A and 41B and a protruding portion 51b protruded outward from the annular portion 51a is further held on the bottom 21c of the main body 21. The annular portion 51a of the first connection terminal is attached to the upper face of the bottom wall 21c along an outer face of the inner wall 21b (that is, an inner periphery of the annular recess 20). The first connection terminal 51 is made of a conductive material such as a metal, for example. The protruding portion 51b of the first connection terminal 51 extends toward the outer periphery of the annular recess 20 and is positioned in a gap 20c between the stationary contacts 41A and 41B. Moreover, grooves 20b, 20c and 20d are provided between the first connection terminal 51 and the respective stationary contacts 41A and 41B and between end faces 41c and 41d of the stationary contacts 41A and 41B on the bottom face of the annular recess 20 to secure creeping distances between them.

As shown in FIG. 4, the first connection terminal 51 and the stationary contacts 41A and 41B are held on the main body 21 of the housing 2 through an insert molding. An edge of an inner periphery of the annular portion 51a of the first connection terminal 51 is embedded in the inner wall 21b of the main body 21. Outside edges of the stationary contacts 41A and 41B are embedded in the outer wall 21a of the main body 21, respectively.

Figure 5:
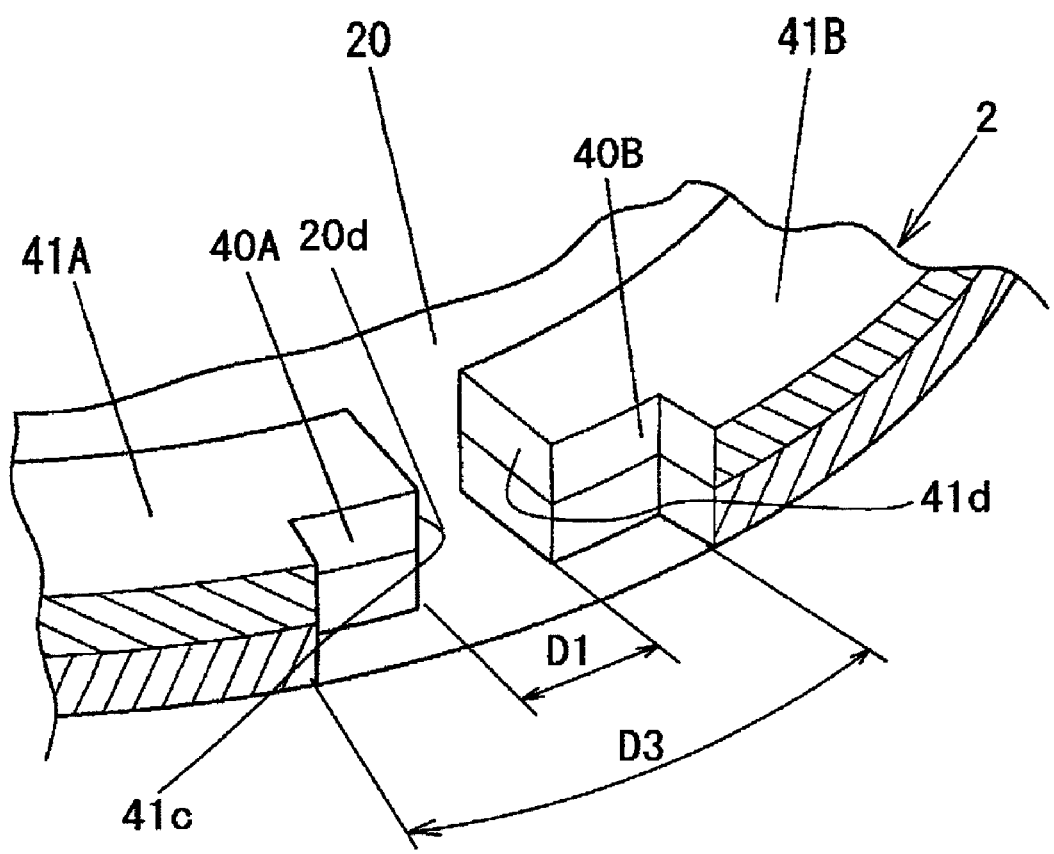
FIG. 5 is a partially sectional perspective view showing a detailed configuration of stationary contacts of the rotary switch.
Figure 6:
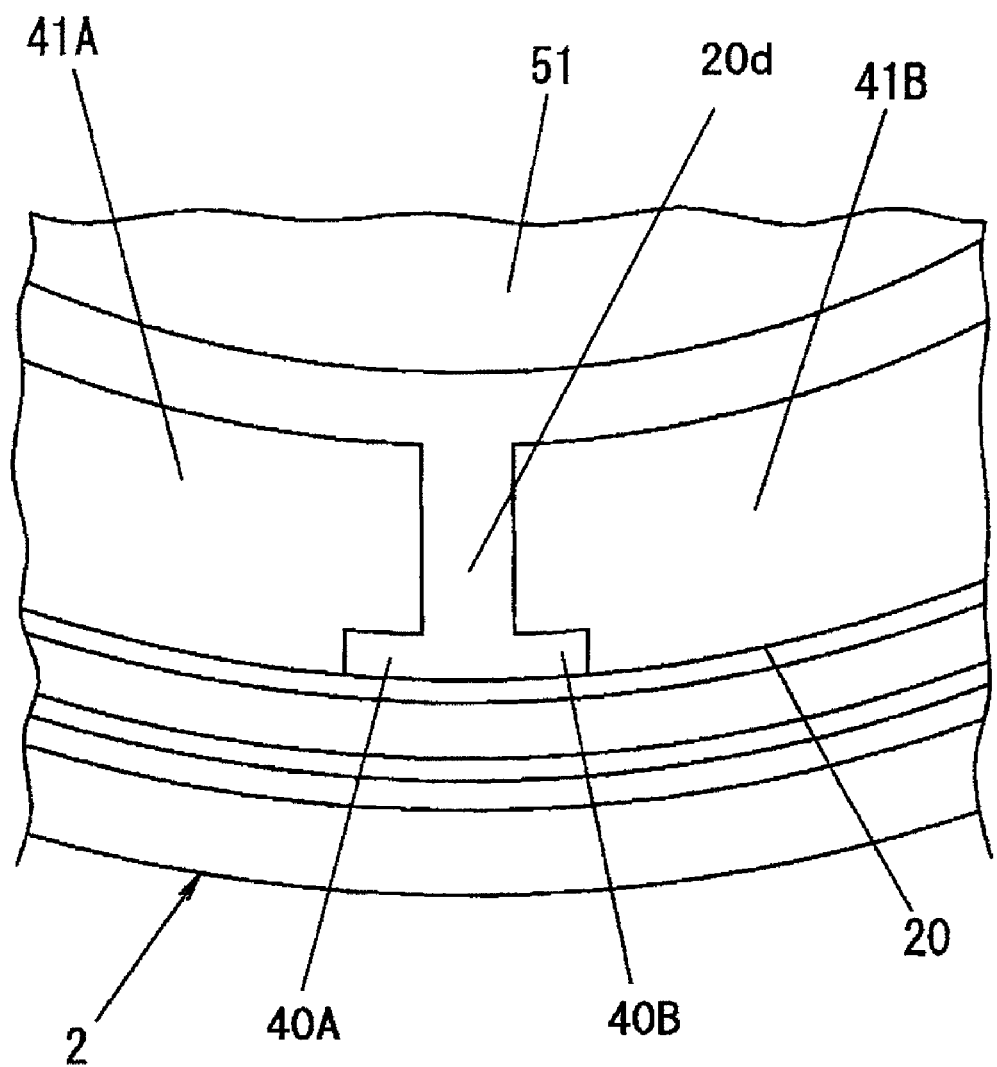
FIG. 6 is a plain view showing a detailed configuration of stationary contacts of the rotary switch and the main body of the housing.

The stationary contacts 41A and 41B respectively have cutouts 40A and 40B of rectangular shape. FIGS. 5 and 6 respectively show detailed configuration of the cutouts 40A and 40B.

The cutout 40A of the stationary contact 41A is located at a corner between the end face 41c of the stationary contacts 41A facing the stationary contact 41B farther from the protruding portion 51b and an outer periphery of the stationary contact 41A facing the periphery of the annular recess 20. Similarly, the cutout 40B of the stationary contact 41B is located at a corner between an end face 41d of the stationary contacts 41B facing the stationary contact 41A farther from the protruding portion 51b and an outer periphery of the stationary contact 41B facing the periphery of the annular recess 20. According to the cutouts 40A and 40B, the creeping distance D3 along the outer periphery of the annular recess 20 can be secured, even though a distance D1 (or a width of a gap 20d) between the stationary contacts 41A and 41B is narrowed so as not to fall the moving contact 42 into the gap 20d between the stationary contacts 41A and 41B in switching the contact.

In addition, creeping distances which follow the bottom face of the recess 20 between the annular portion 51a of the first connection terminal 51 and the stationary contacts 41A and 41B and between the stationary contacts 41A and 41B are secured. Furthermore, the groove 20b can function as a space into which abrasion powders are swept, even when the abrasion powders are generated in a sliding contact of the moving contact 42 with the stationary contacts 41A and 41B or a sliding contact of the first connection terminal 51 with second connecting terminals 52 (refer to FIG. 7). Still furthermore, the groove 20b can function as a space into which lubrication oil such as grease is pooled.

Figure 7:
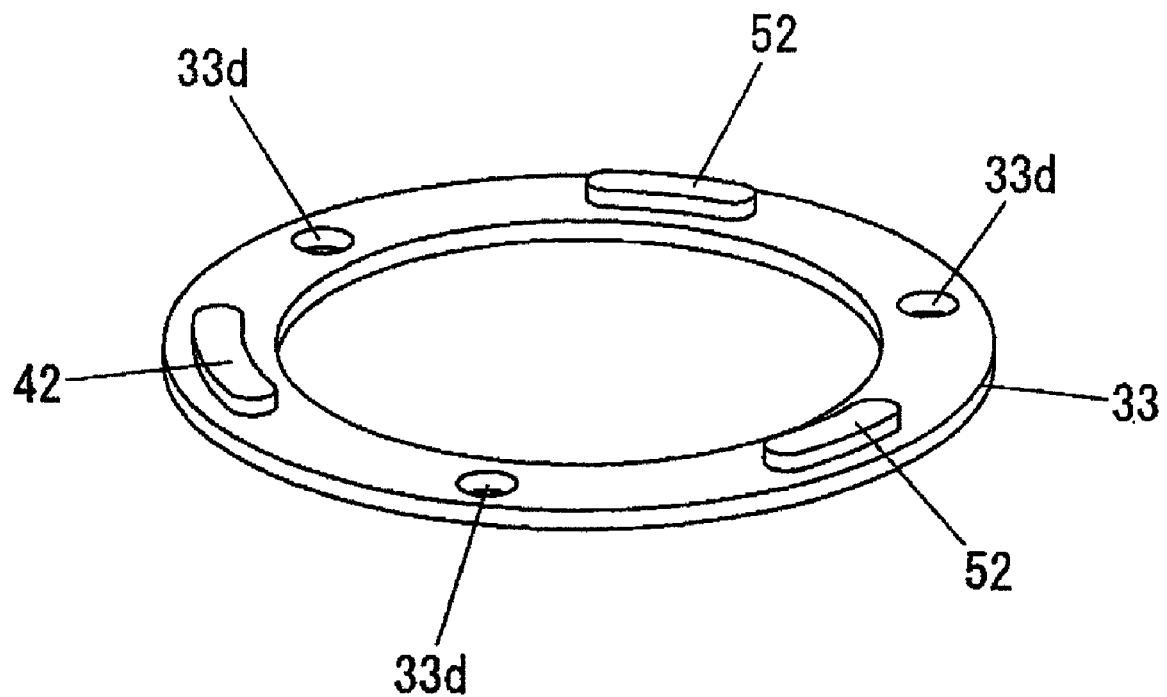
FIG. 7 is a perspective view showing a configuration of a movable contact of the rotary switch.

FIG. 7 shows a detailed configuration of the movable contact 33 of the rotary switch 1. A moving contact 42 which is connected and disconnected with the stationary contacts 41A and 41B following to a rotation of the rotor 3 with respect to the housing 2 is provided on the movable contact 33. The moving contact 42 is provided on one of three areas which is located beneath the pressing springs 34 on the lower surface of the movable contact 33 (the upper surface in FIG. 7), and the second connection terminals 52 are provided on the remaining two areas elastically to contact the first connection terminal 51, respectively. According to such a configuration, one of the stationary contacts 41A and 41B which electrically contacts with the moving contact 42 is electrically connected to the first connection terminal 51 through the movable contact 33.

As shown in FIGS. 1 and 2, an electric cable 70 is pulled out from the cable draw-out portion 22 of the housing 2. The electric cable 70 has three internal cables (not shown), for example, and core wires of the internal cables are electrically connected to the stationary contacts 41A and 41B and the first connection terminal 51, respectively. A contact pressure of the moving contact 42 and a contact pressure of the second connection terminals 52 on the stationary contacts 41A and 41B are provided through the elastic forces of the pressing springs 34. The moving contact 42 is positioned to be slightly closer to an outer periphery of the movable contact 33 compared to the second connection terminals 52.

Figure 8:
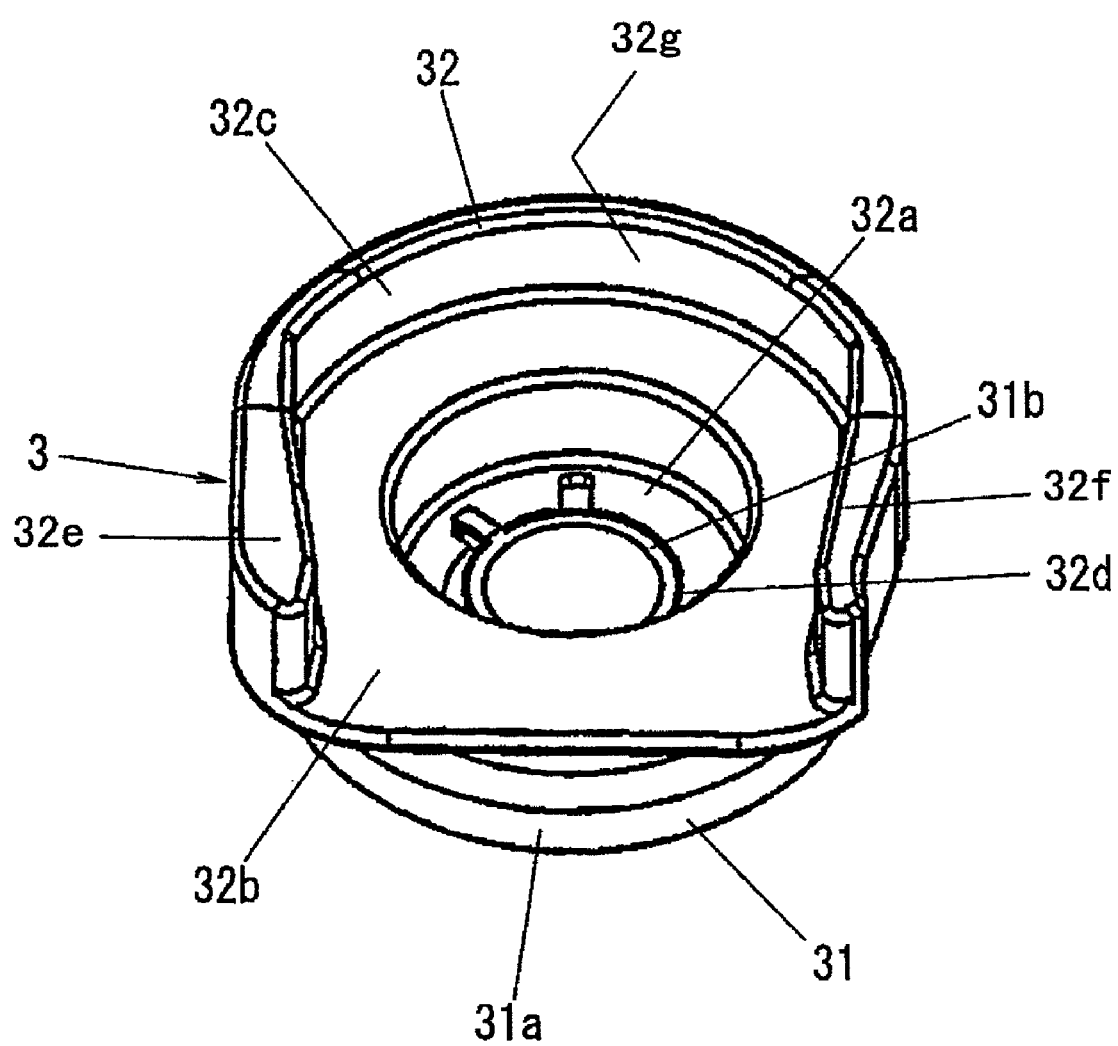
FIG. 8 is a perspective view showing a detailed configuration of a rotor of the rotary switch.
Figure 9A:
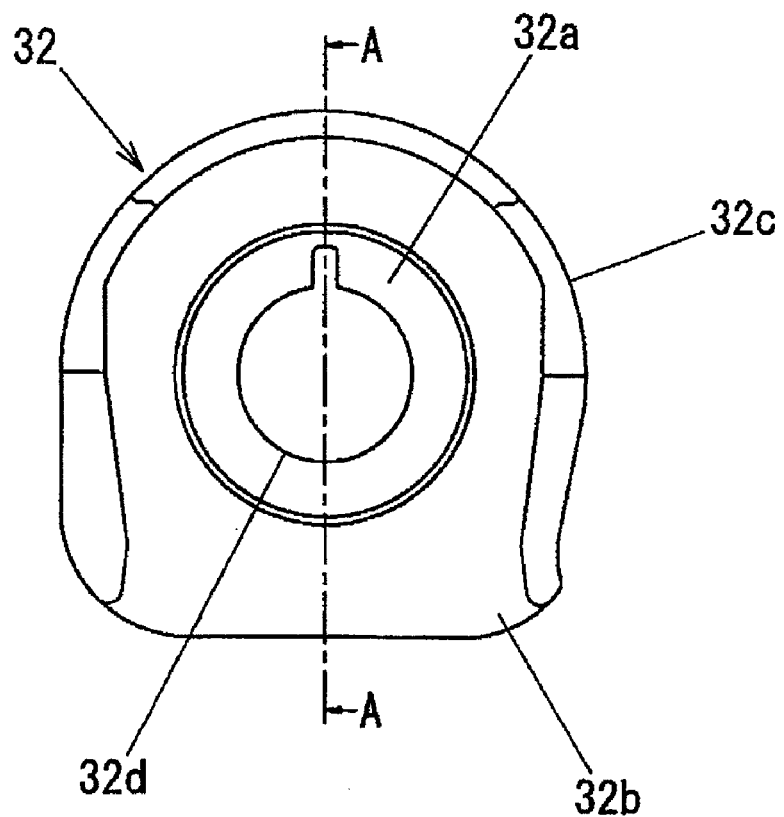
FIGS. 9A and 9B are respectively plain view and bottom view showing a configuration of an outer rotor of the rotor.
Figure 9B:
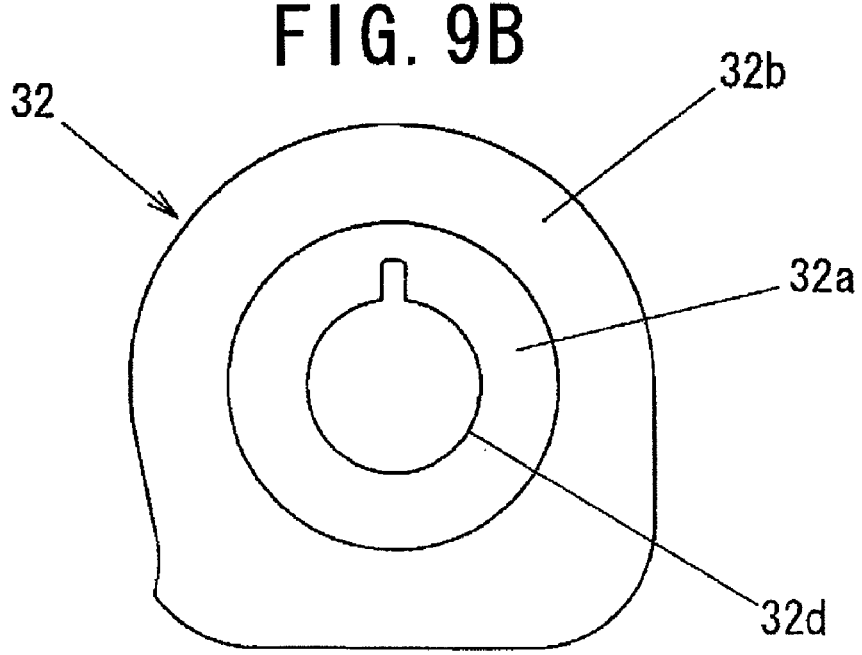
Figure 10:
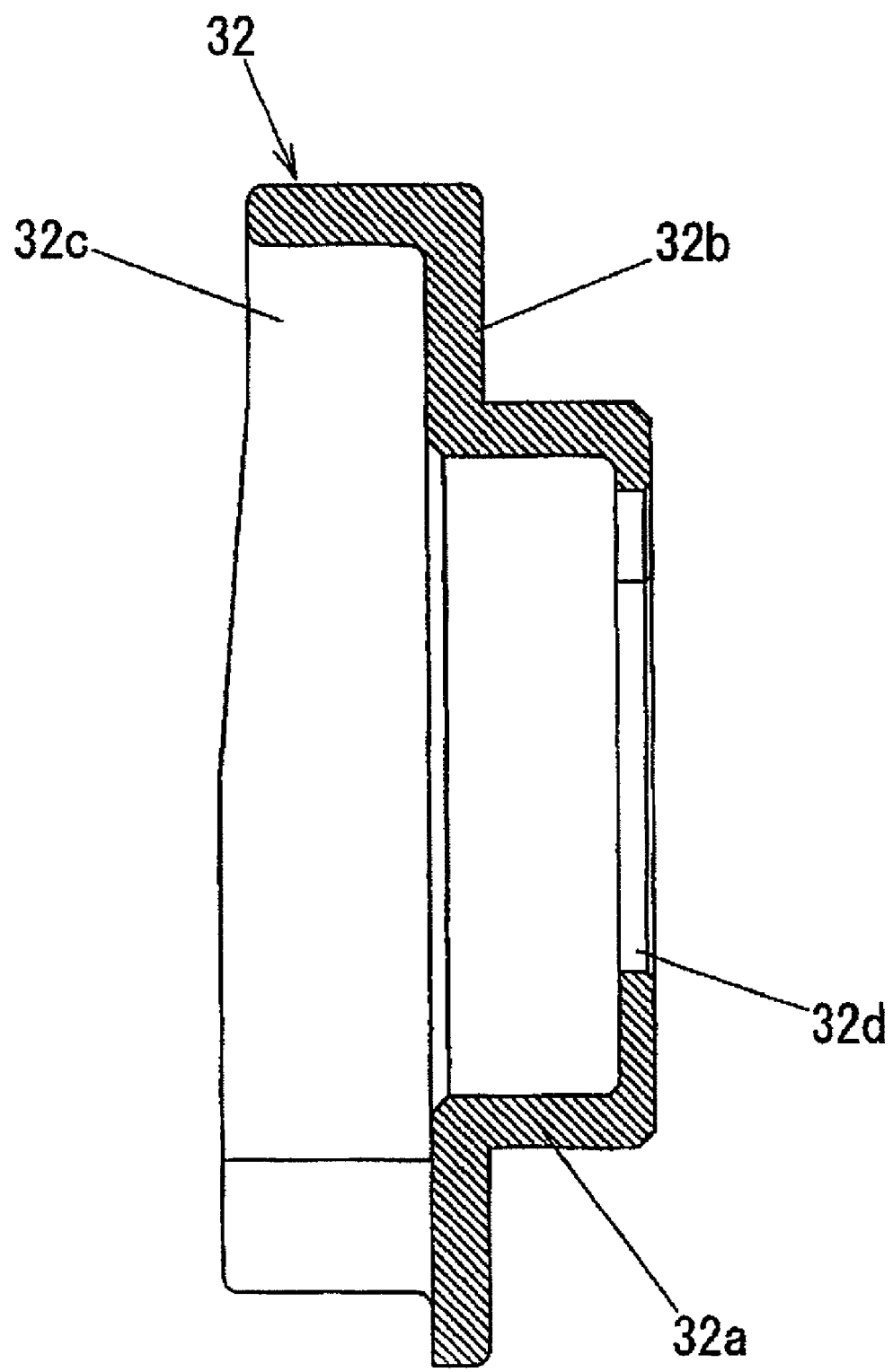
FIG. 10 is a sectional view showing the configuration of the outer rotor.

FIG. 8 is a perspective view of the rotor 3. FIGS. 9A and 9B are respectively plain view and bottom view of the outer rotor 32. FIG. 10 is a sectional view of the outer rotor 32.

The inner rotor 31 has a main frame 31a which has a flat annular shape, a hollow shaft 31b which has a cylindrical shape and protrudes upward from an upper face and downward from a lower face of the main frame 31a, and a coupling portion 31c which has a cylindrical shape and protrudes upward from the upper face of the main frame 31a. As shown in FIG. 1, a part of the rotor 3 is stored in the main body 21 of the housing 2.

The movable contact 33, which has an annular shape, is made of a conductive material such as a metal, for example, and surrounds the hollow shaft 31b is attached to the lower surface of the main frame 31a. A plurality of, for example, three coupling holes 33d is formed on the movable contact 33 so as to pass through the movable contact 33 in the up-down direction. The same number of coupling protrusions 31d as that of the coupling holes 33d are formed to protrude downward from the lower face of the main frame 31a of the inner rotor 31. By inserting the coupling protrusions 31d into the coupling holes 33d, the movable contact 33 rotates in conjunction with the inner rotor 31. Three pressing springs 34 which are compression coil springs, respectively, are provided on an upper surface of the movable contact 33 at an angular interval of 120-degree. The movable contact 33 is urged downward with respect to the inner rotor 31 resulting from an elastic contact of the pressing springs 34 with the lower surface of the main frame 31a in the inner rotor 31.

The outer rotor 32 comprises a main frame 32a which has a cylindrical shape with a bottom and has an opening on an upper surface, a flange 32b which protrudes outward from an upper edge of the main frame 32a, and a coupler 32c which has U-shape protrusion upward from a rim of the flange 32b. The outer rotor 32 is connected with the inner rotor 31 with an ultrasonic welding or a laser welding, for example, in a state that the outer rotor 32 is inserted into the coupling portion 31c in the inner rotor 31. An insertion hole 32d, into which the shaft 31b in the inner rotor 31 is inserted, is formed on the bottom of the main frame 32a in the outer rotor 32 in the up-down direction.

Figure 15:
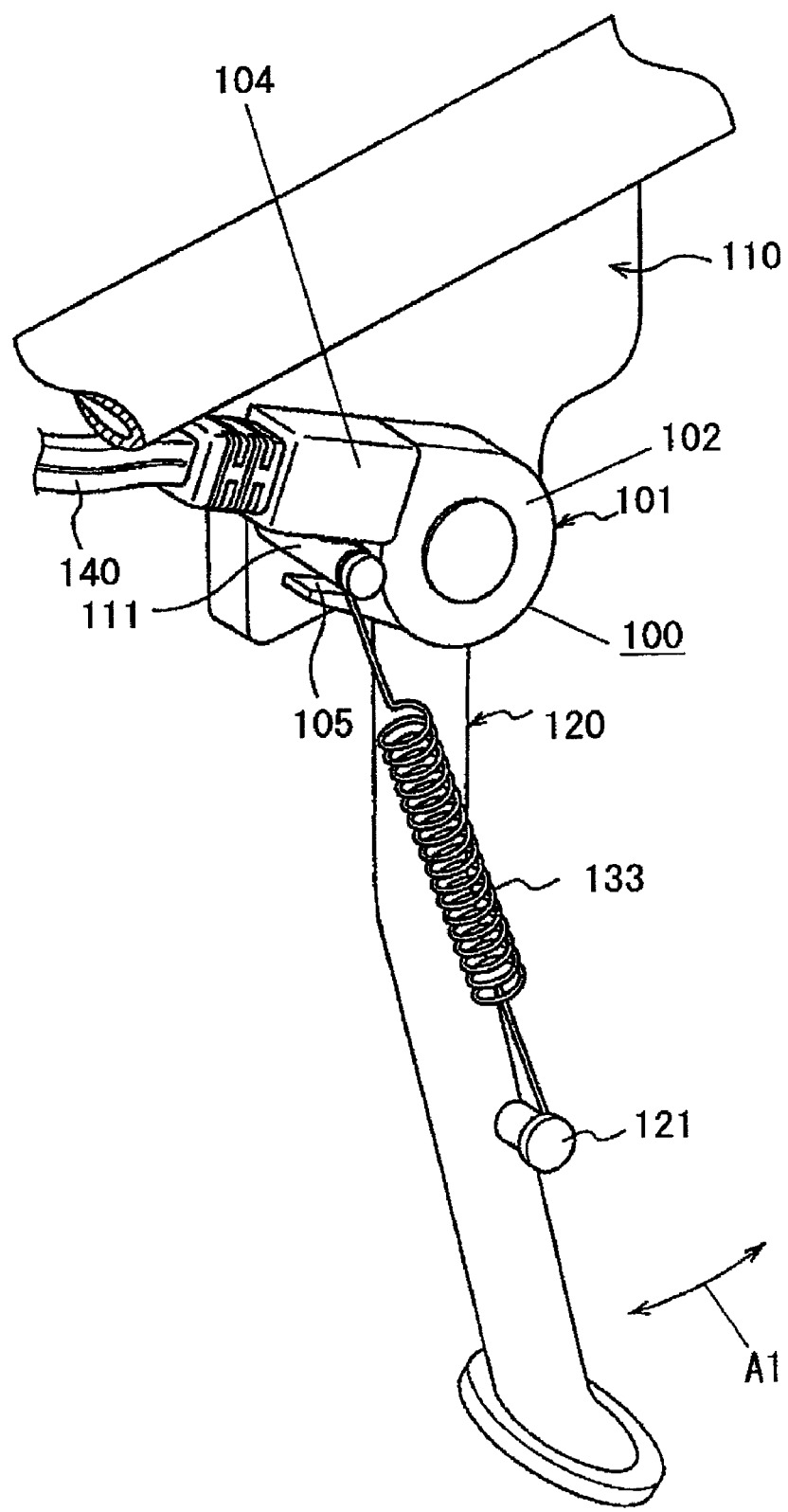
FIG. 15 is a perspective view showing an example of a usage pattern of a rotary switch.
Figure 16:
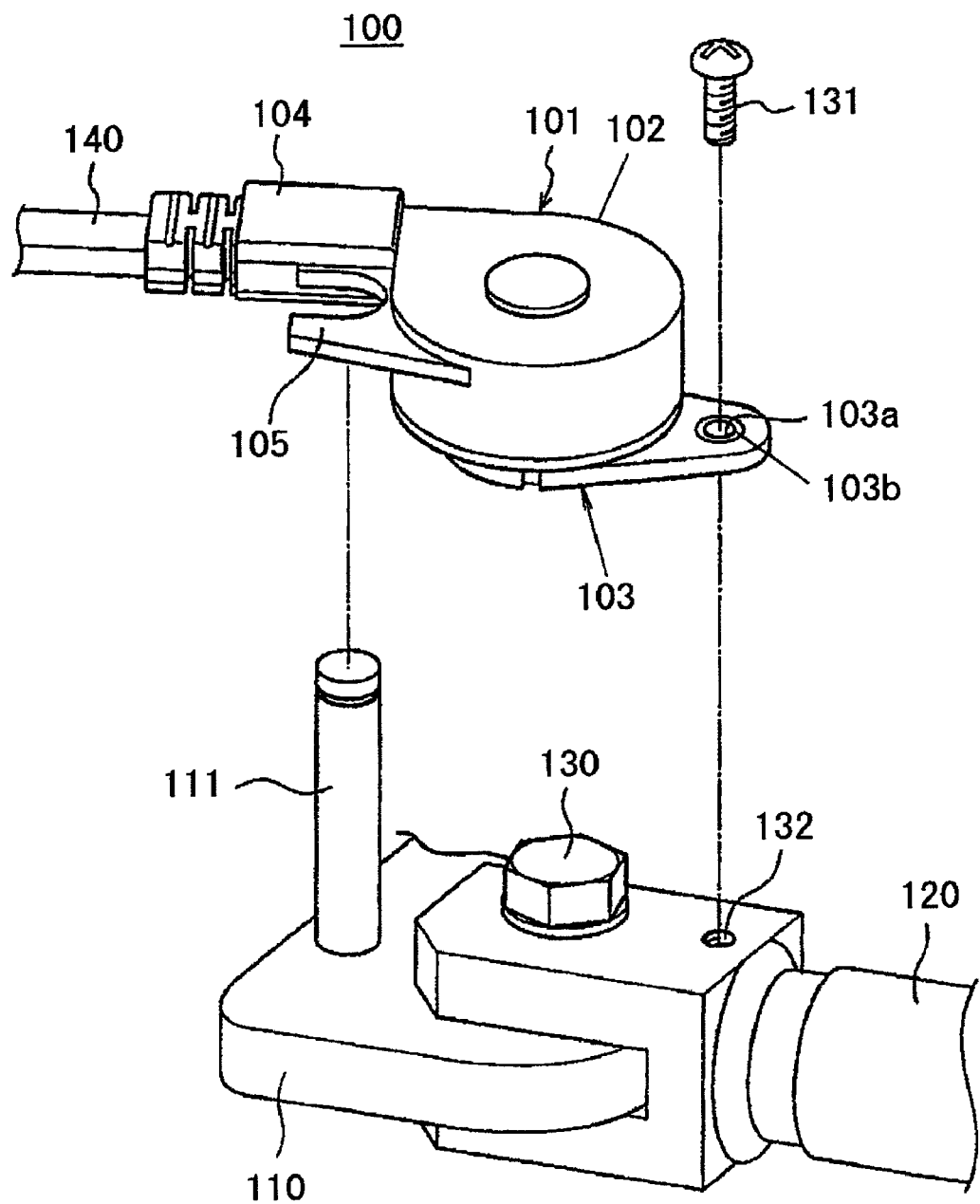
FIG. 16 is a perspective view showing a configuration to attach the rotary switch to a body and stand of a motorcycle
Figure 17:
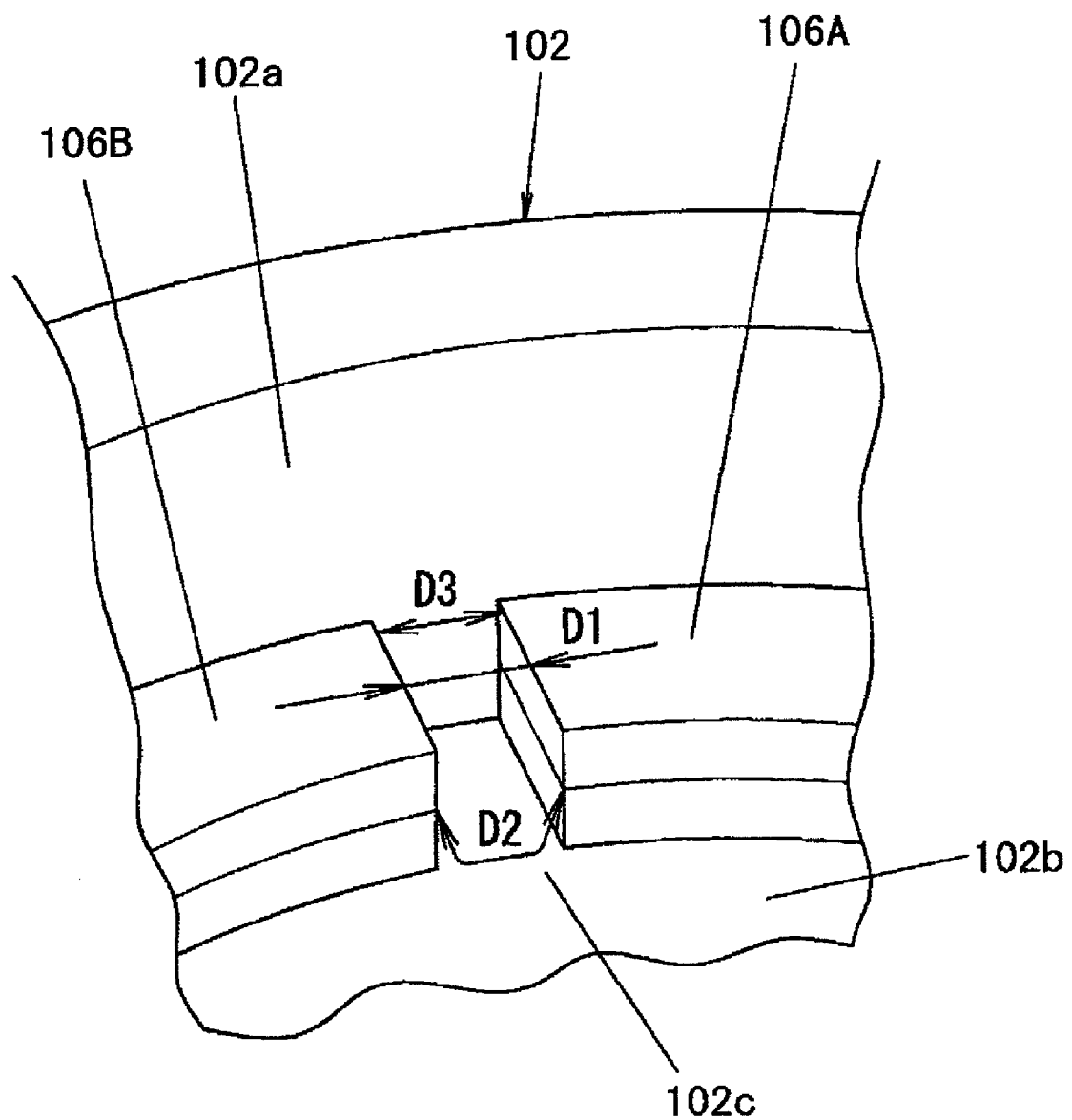
FIG. 17 is a perspective view showing a configuration of stationary contacts of a conventional rotary switch.

Both end portions 32e and 32f of the U-shaped coupler 32c of the outer rotor 32 hold an end of a stand 120 which is pivotally mounted on the body 110 (refer to FIGS. 15 and 16), and thereby the rotor 3 works with the stand 120. A central portion 32g of the coupler 32c is formed thinner in comparison with the both end portions 32e and 32f of the coupler 32c which directly contact with the stand 120 so as to provide a gap between the coupler 32c and the stand 120. Moreover, the both end portions 32e and 32f of the coupler 32c are formed so that a distance between inner faces of them facing each other becomes gradually narrower toward the ends of the coupler 32c.

A first oil seal 61 having an annular shape and made of a synthetic rubber, for example, is provided between the upper surface of the main frame 31a of the inner rotor 31 and a lower surface of the flange 32b of the outer rotor 32 so as to prevent inflow of rain water or leakage of lubrication oil such as grease through a gap between the rotor 3 and the housing 2. A slide plate 62 having an annular shape and made of a metal is further provided between the main frame 31a of the inner rotor 31 and the first oil seal 61 so as to reduce a friction between the inner rotor 31 and the first oil seal 61.

Furthermore, the insertion hole 20a of circular shape is formed at a center of the bottom wall 21c of the main body 21 of the housing 2. A ring-shaped protrusion 21d is formed to protrude downward to enclose the insertion hole 20a on the lower face of the housing 2. The hollow shaft 31b of the inner rotor 31 is inserted into the insertion hole 20a, so that the rotor 3 is pivotally supported on the housing 2. A screw 75 which is screwed in a screw hole (not shown) in the stand 120 is inserted into a center hole of the shaft 31b of the inner rotor 31. The screw 75 has a flange 76 which has a size and shape not to pass through the insertion hole 20a disposed below the housing 2.

A second oil seal 63 having an annular shape and made of a synthetic rubber, for example, is provided between the inner periphery of the insertion hole 20a and the hollow shaft 31b of the inner rotor 31 so as to prevent inflow of rain water or leakage of lubrication oil such as grease through a gap between the rotor 3 and the housing 2. A flange 63a which protrudes outward in a radial direction is formed at an end of an outer side of the second oil seal 63 in an axial direction. The flange 63a is held between the lower face of the housing 2 and an upper face of a flange 76, and thereby a displacement of the second oil seal 63 in the up-down direction with respect to the housing 2 is prohibited.

Since the rotor 3 is made of the synthetic resin, so that the manufacturing cost thereof can be reduced in comparison with the case of using the metal component for the coupler between the rotor 3 and the stand 120 as the conventional manner.

Moreover, since the coupler 32c is formed to have a U-shape with the both end portions 32e and 32f which hold the stand 120, a mechanical strength of the coupler 32c is improved in comparison with the case of forming the coupler 32c only with the portion of holding the stand 120.

Furthermore, since the both end portions 32e and 32f of the coupler 32c are formed so that the distance between the inner faces of them becomes gradually narrower toward the ends of the coupler 32c, a gap is provided between the inner surface of the coupler 32c and the stand 120, and thus, it is possible to apply the rotary switch of the present invention to a plurality of types of the motorcycles which have different rotation axis positions of the stand 120 with respect to the body 110 or different shapes of the stand 120.

Subsequently, a detailed configuration of the cable draw-out portion 22 of the housing 2 is described.

Since the rotary encoder 1 is attached to the joint between the body 110 and the stand 120 in the motorcycle, an external force may be applied to the cable draw-out portion 22, and thus, the core wires of the internal cables of the electric cable 70 may be broken when the applied external force is large. In addition, in order to reduce the manufacturing cost of the rotary encoder 1, it is preferable that the core wires of the internal cables can easily be connected to terminals which are connected to the stationary contacts 41A and 41B and the first connection contact 51. Moreover, it is preferable to increase reliability of connection between the core wires and the terminals to detect the state of the stand 120 with respect to the body 110.

Figure 11:
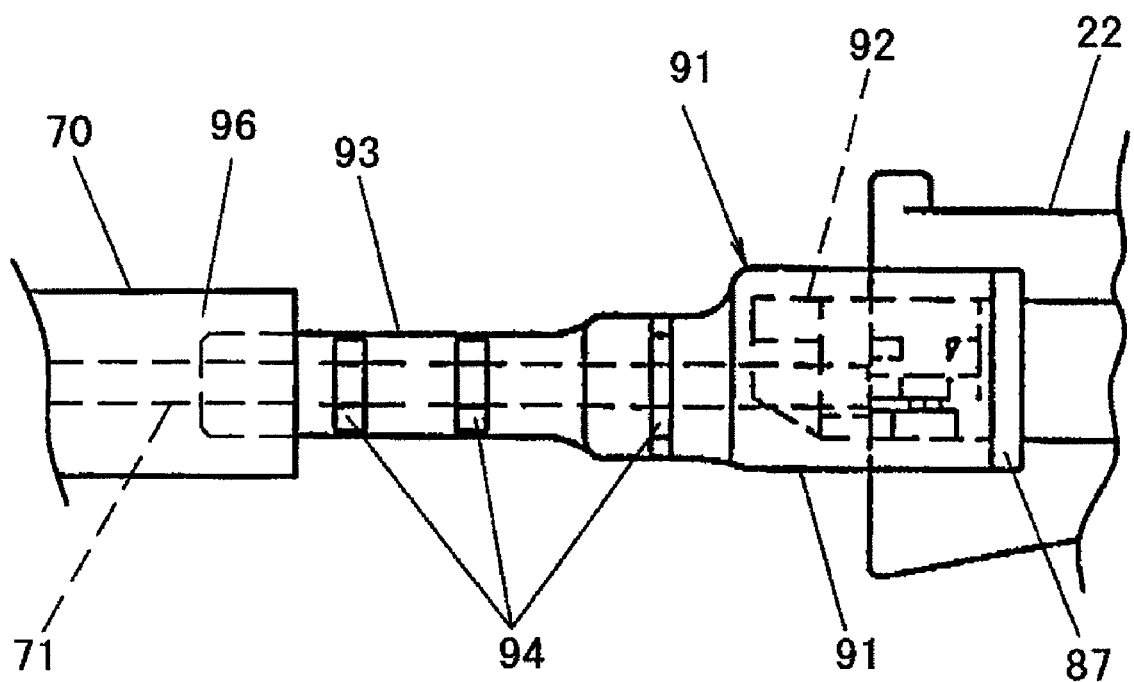
FIG. 11 is a side view showing a configuration of a cable draw-out portion of the rotary switch.
Figure 12:
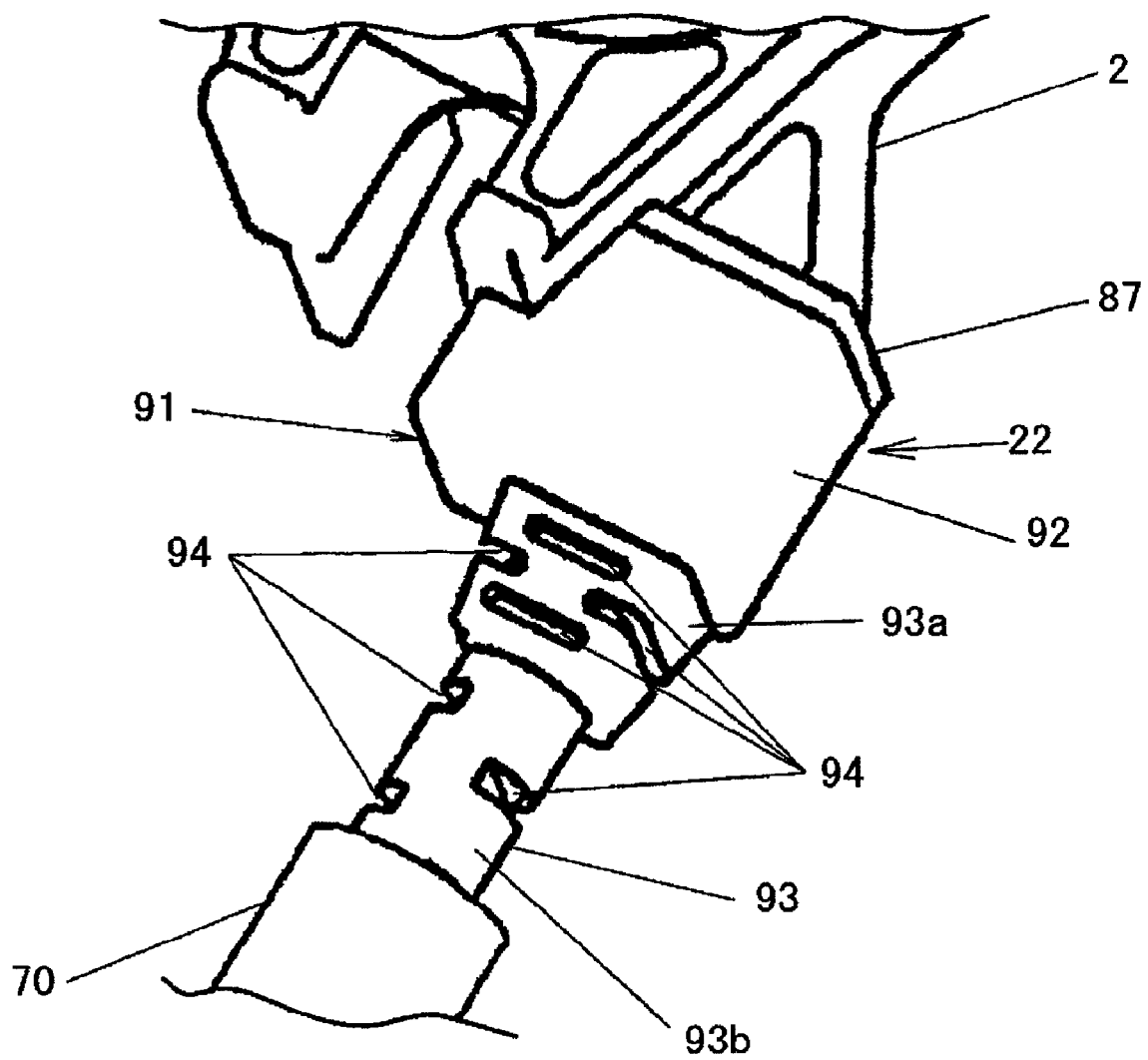
FIG. 12 is a perspective showing the configuration of the cable draw-out portion of the rotary switch.
Figure 13:
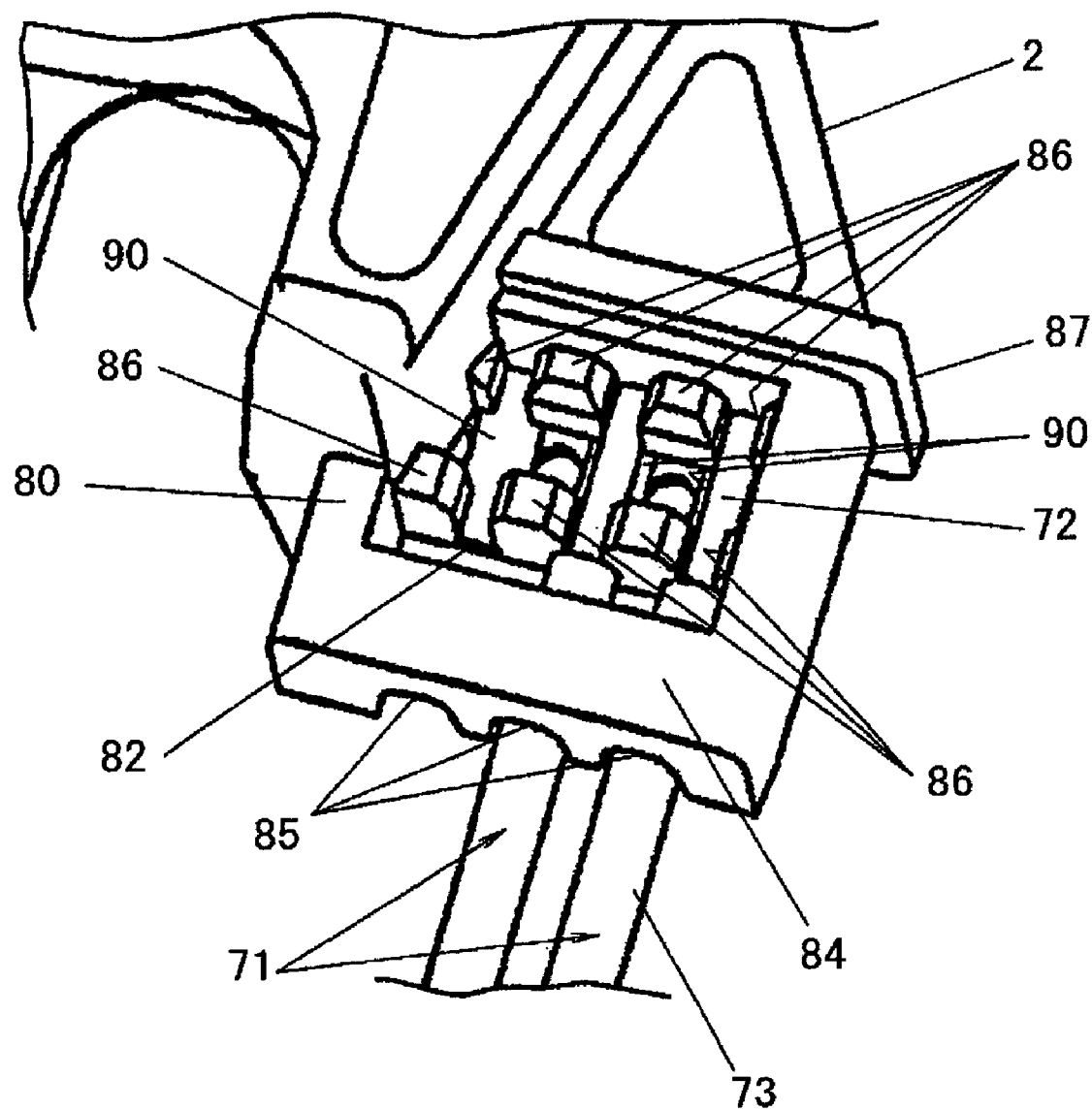
FIG. 13 is a perspective showing the configuration of the cable draw-out portion of the rotary switch before sealing.
Figure 14:
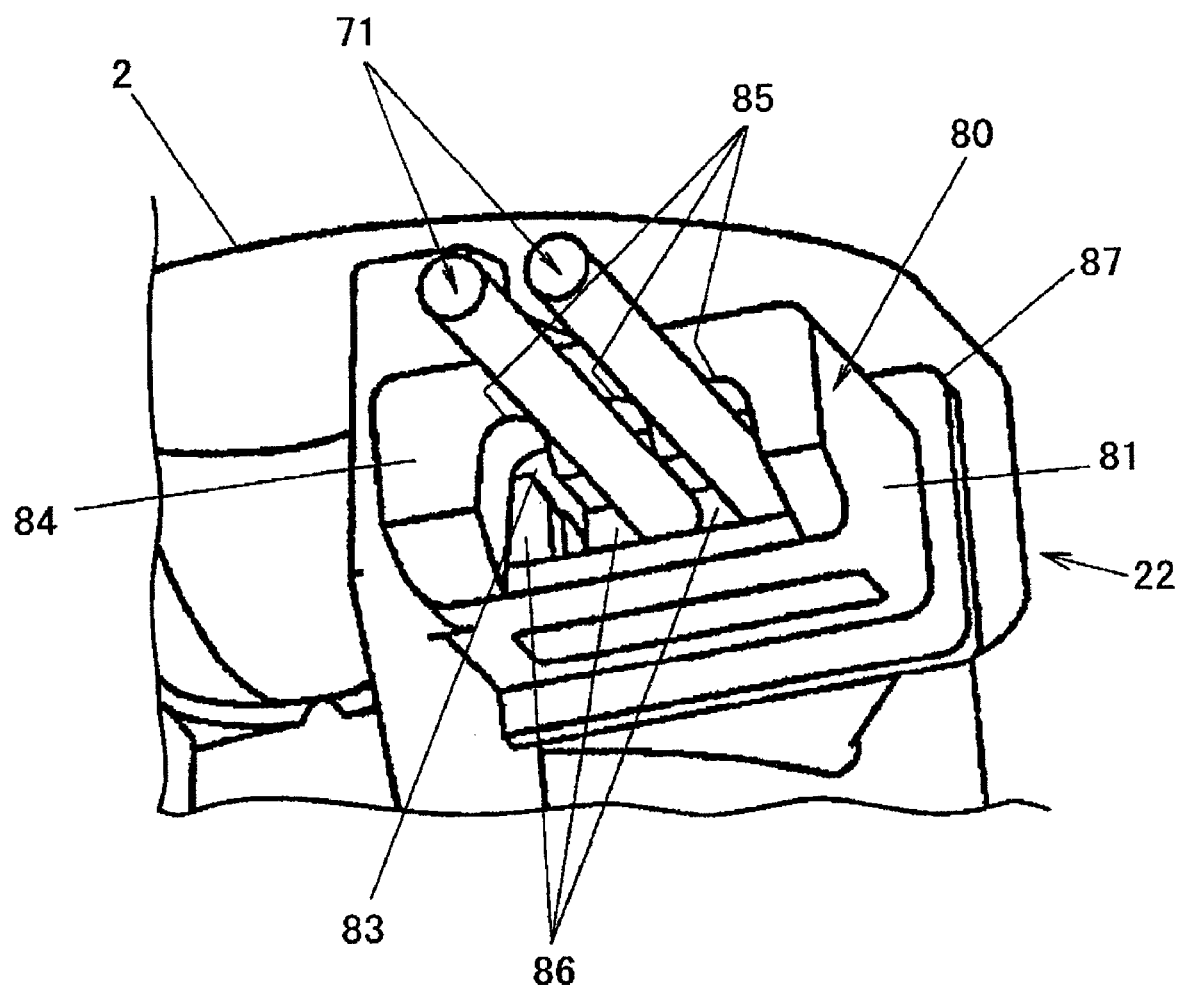
FIG. 14 is a perspective showing the configuration of the cable draw-out portion of the rotary switch before sealing, which is observed from a different direction from that in FIG. 13.

FIGS. 11 and 12 respectively show an appearance of the cable draw-out portion 22. FIGS. 13 and 14 respectively show a main portion of the cable draw-out portion 22 before sealing.

As described above, the electric cable 70 has three internal cables which are electrically connected to the stationary contacts 41A and 41B and the first connection terminal 51, respectively. In FIGS. 13 and 14, two internal cables 71 are illustrated for making clearly understandable of the configuration of the terminals in the cable draw-out portion 22. Each internal cable 71 is configured by a core cable 72 made of a conductive material, such as a metal and an insulation coating 73 for coating an outer face of the core wire 72.

The cable draw-out portion 22 comprises a terminal base 80 made of a synthetic resin and terminals 90 made of a metal and held on the terminal base 80. A front end of each core wire 72 from which the insulation coating 73 is peeled off is electrically and mechanically connected to the terminal 90 by resistance welding, for example. As shown in FIG. 13, the terminal base 80 is integrally formed with the housing 2, for example.

The terminal base 80 has a main body 81 having a substantially cuboid shape, and a recess 82 is formed on an upper face of the main body 81. Three terminals 90 are held on a bottom face of the recess 82 so as to be arranged in a longitudinal direction of the main body 81. As shown in FIG. 14, an opening 83 is formed on a holding portion 84 disposed at front end of the main body 81 so that the internal cables 70 can be inserted into the recess 82 through the opening 83. In addition, three internal cable guides 85 such as semicircular grooves are formed on an inner periphery of the opening 83, each guiding a portion of the internal cable 71 where the insulation coating 73 is not peeled off. Front-lower edges of the holding portion 84 of the main body 81 are canted.

As shown in FIG. 13, three sets of core wire guides (protrusions) 86 are formed at both sides of the terminals 90 on the bottom face of the recess 82 so as to hold the core wire 71 of each internal cable 72 between side walls of the core wire guide 86. That is, the core wire 72 is guided from both sides in a radial direction of the core wire by the core wire guide 86. Under a condition that the front end portion of the core wire 72 is guided by the core wire guide 86, the front end portion of the core wire 72 and the terminal 90 are electrically and mechanically connected with each other by the resistance welding.

The terminal base 80 has a flange 87 formed at a rear end of the main body 81 to protrude outward along an outer periphery of the main body in a direction perpendicular to a center axis of the core wire 72. The flange 78 serves as a stopper to stop a flow of a sealing material such as a synthetic resin when the terminal base 80 with the terminals 90 and the internal cables 70 are sealed by the sealing material.

After connecting the core wires 72 to the terminals 90, the housing 2 having the terminal base 80 is inserted into a molding die with the internal cables 71 of the electric cable 70, and the sealing material is filled in the die by injection molding, for example. As shown in FIGS. 11 and 12, the terminal base 80 and the internal cables 71 are sealed by a sealing body 91 made of the sealing material. The flange 87 is not sealed by the sealing body 91.

In the sealing process, since the flange 87 serves as the stopper of the flow of sealing material, an area to which the sealing material flows is restricted by the flange 87, and thus, the sealing material cannot flow rearward of the flange 87. In other words, there is no weld flash protruded rearward from the flange 87. The sealing body 91 has a base portion 92 which has a cuboid shape and seals the terminal base 80 other than the flange 87 and the terminals 90, and a bushing portion 93 which is continuously formed from a front side of the base portion 92 to enclose the internal cables 71. The bushing portion 93 has a plurality of concave portions 94 respectively oblong in a circumferential direction of the internal cables 71 on its outer face.

In the bushing portion 93, a shape of a portion 93a near to the base portion 92 is made larger than that in other portions 93b of the bushing portion 93. In addition, a protector 96 having a larger dimension that of the bushing portion 93 is further formed integrally with the sealing body 91 and continuous to the bushing portion 93 by the sealing material, so that the internal cables 71 are protected by the protector 96 in a region which is not covered by the sealing body 5. A rear end of the protector 96 covers a front end of the bushing portion 93 of the sealing body 91. For reference, a tube shaped protector which was independent from the bushing portion was conventionally attached to the front end of the bushing portion. According to such a configuration, forming and fixing of the protector 96 is performed simultaneously with the sealing process.

The sealing material has flexibility in an extent not to generate breaking of core wires 72 in the internal cables 71. It is desirable to use an elastomer as for the sealing material constituting the sealing body 91, because it becomes easier to change a direction of drawing out the electric cables 70 in comparison with a case of using a material having a lower flexibility than the elastomer.

According to the above mentioned configuration, since forming and fixing of the protector 96 which protects the bushing portion 93 that prevents incursion of water into a portion near to the terminals 90 and the internal cables 71 are performed simultaneously by forming the sealing body 91, the manufacturing cost of the cable draw-out portion 22 can be reduces in comparison with the case of using a bushing member and a protector of independent elements.

Furthermore, since the flange 87 is provided, it is no need to control the area to which the sealing material flows by pressure of the sealing material in the injection molding, for example. Thus, the condition of molding the sealing body 91 can be loosened and the sealing of the terminal base 91 can be made easier in comparison with a case that no flange is provided on the terminal base 91 for molding the sealing material, and consequently the sealing process of the cable draw-out portion 22 becomes easier. In addition, since the pressure of the sealing material in the injection molding can be increased by providing the flange 24, it is possible to make the sealing material contact with the terminal base 91 faster in the die. Thus, the sealing material of a high temperature can be contacted with the terminal base 91, it is possible to increase degree of adhesion between the terminal base 91 and the sealing material, and effect of sealing can be increased.

Furthermore, when the core wires 72 of the internal cables 71 are introduced on the terminals 90, the internal cables 71 are guided by the core wire guides 86 and the internal cable guides 85, so that the connection of the core wires 72 of the internal cables 71 to the terminals 90 becomes easier. When the core wires 72 of the internal cables 71 are introduced on the terminals 90, displacements of the internal cables 71 are prevented by the core wire guides 86 and the internal cable guides 85, so that reliability of connection of the core wires 72 and the terminals 90 is secured.

Still furthermore, even when each of the core wires 72 of the internal cables 71 consists of a plurality of fine cables, and when no preparation such as soldering for preventing feazing of the core wires 72 is performed, the feazing of the core wires 72 can be prevented by the core wire guides 86.

Although, two cutouts 40A and 40B are formed on both of the stationary contacts 41A and 41B so as to face each other in the above mentioned embodiment, it is preferable that at least one stationary contact 41A or 41B has a cutout 40A or 40B of a rectangular shape located at a corner between an end face of the stationary contact 41A, for example, facing another stationary contact 41B and an outer periphery of the stationary contact 41A facing the inner face of the outer wall of the housing 2 so that a creeping distance D3 along the inner face of the outer wall 21a of the main body 21 of the housing 2 is secured a predetermined distance.

This application is based on Japanese patent applications 2006-261504, 2006-261505, 2006-261506 and 2006-261507 filed Sep. 26, 2006 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A rotary switch comprising:
 a housing having a cylindrical shape with a ring-shaped outer wall, a ring shaped inner wall provided along an opening of an insertion hole and an annular bottom wall such that an annular recess is provided between the outer wall and the inner wall;
 a rotor which is rotatably supported on the housing around a central axis of the annular recess;
 a plurality of stationary contacts each having a flat circular arc shape and provided on a bottom surface of the annular recess at a same radial distance along an inner face of the outer wall of the housing; and
 a moving contact which is provided on the rotor and is connected with and disconnected from the stationary contacts in accordance with rotation of the rotor with respect to the housing, wherein
 at least one of said plurality of stationary contacts have a cutout of a rectangular shape located at a corner between an end face of the stationary contact that faces another stationary contact and an outer periphery of the stationary contact that faces the inner surface of the outer wall of the housing so that a creeping distance along the inner surface of the outer wall of the housing is maintained as a predetermined distance.

2. The rotary switch in accordance with claim 1, wherein each stationary contact has the cutout so that a cutout of one stationary contact faces a cutout of another stationary contact.

3. The rotary switch in accordance with claim 1, wherein a connection contact having an annular portion concentrically disposed inside of the stationary contacts is further provided on the bottom surface of the annular recess; and
 grooves are provided on the bottom face of the annular recess between the annular portion of the connection terminal and the stationary contacts and between end faces of the stationary contacts to maintain the creeping distances between them.

4. The rotary switch in accordance with claim 3, wherein an inside edge of the annular portion of the connection terminal is embedded in the inner wall of the housing; and
 outside edges of the stationary contacts are embedded in the outer wall of the housing, respectively.

5. The rotary switch according to claim 1, said cutout being configured such that a width, of the end portion of the stationary contact, at the cutout, is smaller than a width of the end portion of the stationary contact that spaced from the cutout.

6. The rotary switch according to claim 1, a cutout of an end face of a stationary contact being positioned so as to face a cutout of an end face of another stationary contact at a same radial distance.

7. The rotary switch according to claim 1, each stationary contact having a continuously circular arc at a same radial distance along the bottom surface of the annular recess.

8. The rotary switch according to claim 1, each cutout having a same shape.

9. A rotary switch comprising:
 a housing which has stationary contacts and is connected with a stationary portion of an object; and
 a rotor which comprises a synthetic resin, has a moving contact connectable to and disconnectable from the stationary contacts, the rotor being rotatably supported on the housing around a central axis, and being connected with a movable portion of the object, wherein
 the rotor has a U-shaped coupler which holds an end portion of the movable portion of the object near a rotation axis of the movable portion of the object pivotally mounted on the stationary portion, so that the rotor rotates in accordance with rotation of the movable portion with respect to the stationary portion, the U-shaped coupler has a U-shape protrusion extending upward from a rim of a flange of the rotor which is perpendicular to the rotation axis of the movable portion; and both end portions of the U-shaped protrusion directly contact the movable portion.

10. The rotary switch in accordance with claim 9, wherein the both end portions of the U-shaped protrusion are configured so that a distance between inner faces of the U-shaped protrusion facing each other becomes gradually narrower toward the ends of the coupler.

11. The rotary switch in accordance with claim 10, wherein a central portion of the U-shaped protrusion is thinner with respect to both end portions of the U-shaped protrusion so as to provide a gap between the U-shaped coupler and the movable portion.

12. A rotary switch comprising:

a housing having a ring-shaped outer wall defining an annular recess;

a rotor which is rotatably supported on the housing around a central axis of the annular recess;

a plurality of stationary contacts each having a circular arc shape and provided on a bottom surface of the annular recess at a same radial distance along an inner surface of the outer wall of the housing;

a moving contact which is provided on the rotor and is connectable with and disconnectable from the stationary contacts in accordance with rotation of the rotor with respect to the housing; and a cable draw-out portion from which an electric cable including a plurality of inner cables respectively connected to at least the stationary contacts is drawn out from the housing, wherein the cable draw-out portion has a terminal base on which terminals connected to at least the stationary contacts are held;

the terminal base and the electric cable are respectively sealed by a sealing material such that core wires of the internal cables are respectively electrically connected to the terminals; and the terminal base has a flange that restricts an area to which the sealing material flows during sealing.

13. The rotary switch in accordance with claim 12, wherein the flange is provided at a rear end of a main body of the terminal base to protrude outward along an outer periphery of the main body in a direction perpendicular to a central axis of the core wire.

14. The rotary switch in accordance with claim 12, wherein the sealing material is an elastomer.

15. A rotary switch comprising:

a housing having a ring-shaped outer wall defining an annular recess;

a rotor which is rotatably supported on the housing around a central axis of the annular recess;

a plurality of stationary contacts each having a circular arc shape and provided on a bottom surface of the annular recess at a same radial distance along an inner surface of the outer wall of the housing;

a moving contact which is provided on the rotor and is connectable and disconnectable from the stationary contacts in accordance with rotation of the rotor with respect to the housing; and a cable draw-out portion from which an electric cable including a plurality of inner cables respectively connected to at least the stationary terminals is drawn out from the housing, wherein the cable draw-out portion has a terminal base on which terminals connected to at least the stationary contacts are held; and the terminal base has a plurality of core wire guides formed at both sides of the terminals each to guide a front end portion of a core wire of the internal cable which is not coated by an insulation coating, and a plurality of internal cable guides each to guide a portion of the internal cable coated by the insulation coating.

16. The rotary switch in accordance with claim 15, wherein each core wire guide comprises a plurality of protrusions that nip the core wire from both sides in a radial direction of the core wire.

17. The rotary switch in accordance with claim 15, wherein each internal cable guide is a groove provided on an end portion of the terminal base opposite to the housing of the rotary switch.

18. The rotary switch in accordance with claim 15, wherein the terminal base and the electric cable are respectively sealed by a sealing material such that core wires of the internal cables are respectively electrically connected to the terminals.

19. The rotary switch in accordance with claim 18, wherein the terminal base has a flange that restricts an area to which the sealing material flows during sealing, and is provided at a rear end of a main body of the terminal base to protrude outward along an outer periphery of the main body in a direction perpendicular to a central axis of the core wire.

* * * * *